United States Patent [19]

Bailey

[11] 4,017,450

[45] Apr. 12, 1977

[54] INHIBITION OF POLY(ARYLENE SULFIDE) RESIN INDUCED METAL CORROSION

[75] Inventor: Fay W. Bailey, Bartlesville, Okla.

[73] Assignee: Phillips Petroleum Company, Bartlesville, Okla.

[22] Filed: Mar. 29, 1976

[21] Appl. No.: 671,191

[52] U.S. Cl. .................. 260/37 R; 260/45.7 R; 260/79; 260/79.1

[51] Int. Cl.² ........................................ C08L 81/04

[58] Field of Search ............... 260/37 R, 79, 79.1, 260/45.7 R

[56] References Cited

UNITED STATES PATENTS

| 2,465,512 | 3/1949 | Carasso | 260/29.2 |
| 2,513,188 | 6/1960 | Macallum | 260/79 |
| 2,999,837 | 9/1961 | Franzus | 260/45.7 |
| 3,037,837 | 6/1962 | Ross | 21/2.5 |
| 3,050,360 | 8/1962 | de Roos et al. | 21/2.7 |
| 3,249,075 | 5/1966 | Nelson et al. | 110/1 |
| 3,354,129 | 11/1967 | Edmonds et al. | 260/79 |
| 3,565,672 | 2/1971 | Adams | 217/75 |
| 3,699,087 | 10/1972 | Wood et al. | 260/79 |
| 3,746,643 | 7/1973 | Rogers | 252/33 |
| 3,919,177 | 11/1975 | Campbell | 260/79.1 |

FOREIGN PATENTS OR APPLICATIONS 962,941  7/1964  United Kingdom ................ 260/79

OTHER PUBLICATIONS

Modern Plastics Encyclopedia; 1964; vol. 41, No. 1A; pp. 529–536.

Primary Examiner—Lewis T. Jacobs

[57] ABSTRACT

Metal corrosion which results from metal being in contact with molten poly(arylene sulfide) resin, especially as in injection molding, is inhibited by forming an intimate mixture of poly(arylene sulfide) resin with a sufficient amount of at least one hydroxide or carbonate of an alkali metal.

17 Claims, No Drawings

INHIBITION OF POLY(ARYLENE SULFIDE) RESIN INDUCED METAL CORROSION

This invention relates to poly(arylene sulfide) resin compositions. In another aspect this invention relates to a method for inhibiting the tendency of molten poly(arylene sulfide) resin to cause metal in contact therewith to corrode. In a further aspect this invention relates to a method for at least substantially eliminating the tendency of poly(arylene sulfide) resin to cause corrosion of the molds employed in molding processes.

Today poly(arylene sulfide) resin engineering thermoplastics having outstanding ability to withstand high temperatures and chemical attack are commercially available. It has been observed that occasionally during the injection molding of certain poly(arylene sulfide) resins mold corrosion occurs. It is presently believed that this corrosion is due at least in part to the evolution of some sulfur dioxide by the molten poly(arylene sulfide) resin. The sulfur dioxide when combined with moisture could adversely affect many metal molds. The amount of corrosion has varied with different lots of poly(arylene sulfide), with molds of different composition, and with molding conditions. The corrosion, when observed, has varied from only a slight attack of the mold after extensive molding to very extensive damage after molding for only a short time. Molds of beryllium copper and Vega tool steel are very susceptible to such mold corrosion while molds of stainless steel, such as 303 Stainless, 304 Stainless, and 316 Stainless, and molds with chrome or nickel plating are most resistant to such corrosion. The use of stainless steel molds and chrome or nickel-plated molds can pose an economic burden upon plastic fabricators that do not already have such molds. Thus, other means of combatting the corrosion problem would be beneficial for the development of the poly(arylene sulfide) resin technology.

The present invention is based upon the discovery that mold corrosion accompanying the molding of poly(arylene sulfide) resins can be inhibited by the employment of a sufficient amount of at least one hydroxide or carbonate of an alkali metal.

Accordingly, an object of the present invention is to provide a method for reducing the possibility that mold corrosion will result when poly(arylene sulfide) resins are molded.

A further object is to provide a poly(arylene sulfide) resin composition that is less likely to cause mold corrosion than prior art poly(arylene sulfide) resin compositions.

A still further object of this invention is to provide a poly(arylene sulfide) resin composition having desirable electrical resistance while also being less likely to cause mold corrosion than poly(arylene sulfide) resin compositions known heretofore.

Other objects, advantages, and features of this invention will be apparent to those skilled in the art upon reading the following description, examples, and appended claims.

The present invention is directed to the improvement of any poly(arylene sulfide) resins which in the molten state contribute to the corrosion of metals, regardless of the method of preparation of the resins. The invention can be used, for example, with poly(arylene sulfide) resins prepared as described in U.S. Pat. No. 2,513,188 wherein polyhalo aromatic compounds are reacted with sulfur and metal sulfide at the fusion temperature. It can also be used with resins manufactured by the method described in British Patent 962,941 wherein metal salts of halothiophenols are heated at a polymerizing temperature. The invention is particularly useful with polymers prepared by the solution reaction of polyhalo compounds with alkali metal sulfides as described in U.S. Pat. No. 3,354,129. If it is desired to employ poly(arylene sulfide) resins of lower melt flow than those obtained through the process of the just previously mentioned patent, the polymers obtained in that process can be modified according to the method disclosed in U.S. Pat. No. 3,699,087. The present invention can also be used upon p-phenylene sulfide polymers prepared as described in U.S. Pat. No. 3,919,177, wherein p-phenylene sulfide polymers are produced by reacting at least one p-dihalobenzene with a mixture in which at least one suitable source of sulfur, at least one alkali metal carboxylate, and at least one organic amide are contacted. Since the techniques of producing poly(arylene sulfide) resins disclosed in the above-mentioned patents are now known to those skilled in the art, further description of those processes will not be set forth herein. For more detail one may refer to the specific patents, which are incorporated herein by reference.

The present invention is particularly useful for the poly(arylene sulfide) resins often called poly(phenylene sulfide) resins. Molding grade poly(phenylene sulfide) resins can be molded into a variety of useful articles by molding techniques which are known in the art. Molding should be carried out generally above the melting point or softening point but below the decomposition point of the particular polymer being molded. Suitable molding techniques include injection molding, compression molding, vacuum molding, extrusion and the like. While the present invention is particularly suitable for preventing corrosion that occurs when poly(phenylene sulfide) resins are injection molded, it is considered that the invention will substantially eliminate corrosion that occurs as a result of any technique involving contacting of metal with molten poly(arylene sulfide) resins.

According to this invention the tendency of a molten poly(arylene sulfide) resin to cause metal corrosion is reduced by employing in combination with the resin a suitable amount of at least one hydroxide or carbonate of an alkali metal. Any amount of alkali hydroxide and/or carbonate can be employed that is sufficient to reduce the tendency of the molten poly(arylene sulfide) to cause corrosion of metal in contact therewith. Generally, the amount of the alkali hydroxide and/or carbonate emloyed is in the range of about 0.1 to about 10 weight percent, preferably about 0.2 to about 5 weight percent, and more preferably about 0.4 to about 2 weight percent, where the weight percent is based on the weight of the poly(arylene sulfide) resin.

The term alkali metal is intended to include lithium, potassium, sodium, and rubidium. Examples of suitable alkali metal hydroxides or carbonates include lithium carbonate, lithium hydroxide, potassium carbonate, potassium hydroxide, sodium carbonate, sodium hydroxide, rubidium carbonate, rubidium hydroxide, and mixtures of any two or more thereof. Lithium, potassium, and sodium carbonates are preferred. Especially preferred are lithium carbonate and sodium carbonate.

According to this invention it is essential for optimum corrosion inhibition that an intimate mixture of the poly(arylene sulfide) resin and the at least one hydroxide or carbonate, as described, be formed before the metal that is subject to the described corrosion is placed in contact with the molten resin. This may be done in any suitable manner. The method now preferred for forming an intimate mixture of the poly(arylene sulfide) resin and the hydroxide and/or carbonate is to dry mix the materials prior to the melting of the resin. The term "intimate mixture" as used herein is intended to denote a mixture in which the ingredients are predominantly uniformly distributed throughout the composition. The dry mix may then be further processed into pellets by techniques well known in the art.

Like any other poly(arylene sulfide) resin compositions, the resin compositions of this invention have utility in uses where high melting point and high temperature stability are desirable. The poly(arylene sulfide) resins of this invention can also include other additives such as fillers, pigments, stabilizers, softeners, extenders, and other polymers. In injection molding, for example, it is quite common to prepare poly(arylene sulfide) resin compositions containing about 20 to about 50 weight percent of conventional glass fiber filler, based on the weight of the poly(arylene sulfide) resin and the glass fiber filler. Generally glass fibers about ¼ inch to about 2 inches in length are employed. Also as known in the art such glass filled compositions can be prepared by feeding continuous glass roving through an extruder along with the thermoplastic. Of course, it would be counterproductive to employ an additive which increases the corrosion tendency of the present inventive composition.

The present invention and its advantages will be further demonstrated by the following examples.

EXAMPLE I

Poly(phenylene sulfide) resin compositions containing various additives were tested employing a steel strip corrosion test designed to subject a metal strip to conditions similar to those existing during molding. The test involved the use of cold rolled mild steel strips 4 inches × 0.5 inches × 0.1 inches (100 mm × 0 13 mm × 2.5 mm) which were smoothed of all burrs on their edges, cleaned with Ajax cleanser and a rag, rinsed with water, and then dried with an acetone rinse. Each thus-prepared steel strip was placed in a test tube along with a 3-gram sample of a polly(phenylene sulfide) resin composition. The top of the test tube was covered with aluminum foil to prevent contamination in the oven and then the tube was placed in an oven set at 675° F (357° C) for 2 hours. The tubes were then removed from the oven and cooled to room temperature. After cooling, the metal strips were removed from the polymer and test tube. In many cases it was necessary to break the test tube and chip the polymer from the metal strip. Next the metal strips were placed above the water level in a glass jar partially filled with water. The glass jar was then sealed with a tight-fitting lid. After 24 hours the strips were removed and corrosion ratings were made as follows:

0 — No corrosion
1 — Slight corrosion
2 — Moderate corrosion
3 — Heavy corrosion
4 — Severe corrosion
5 — Very severe corrosion.

The effect of various additives on inhibiting the corrosion resulting when the steel was contacted with poly(phenylene sulfide) resin and later with moisture is reported in Table I. The poly(phenylene sulfide) resin in all cases was from an identical lot of Ryton P-4 resin, a cured powder form of poly(phenylene sulfide) resin having a melt flow under a 5 Kg load at 315° of less than about 50 grams/10 minutes. (Ryton is a registered trademark of Phillips Petroleum Company). The various additives, when employed, were dry blended with the poly(phenylene sulfide) resin powder to give an intimate mixture. The various additives and the weight percent, based on the weight of the resin is shown in Table I.

TABLE I

| Run No. | Additive, Weight Percent* | Corrosion Rating |
|---|---|---|
| 1 | None | 5 very severe |
| 2 | 0.1 $CaCO_2$ | 3 heavy |
| 3 | 0.2 $CaCO_3$ | 2 moderate |
| 4 | 0.3 $CaCO_3$ | 2 moderate |
| 5 | 0.4 $CaCO_3$ | 1 slight |
| 6 | 1.0 $CaCO_3$ | 0 none |
| 7 | 1.0 NaOH | 0 none |
| 8 | 1.0 NaOH + 1.0 $CaCO_3$ | 0 none |
| 9 | 1.0 $Na_2CO_3$ | 0 none |
| 10 | 1.0 $Na_2CO_3$ + 1.0 $CaCO_3$ | 0 none |
| 11 | 1.0 Sodium silicate | 4 severe |
| 12 | 1.0 Sodium silicate + 1.0 $CaCO_3$ | 0 none |
| 13 | 1.0 Sodium silicate + 1.0 Hi Sil 404 | 2 moderate |
| 14 | 1.0 Melamine | 3 heavy |
| 15 | 1.0 Melamine + 1.0 $CaCO_3$ | 1 slight |
| 16 | 1.0 Sodium sulfite | 4 severe |

*Based on the weight of the poly(phenylene sulfide) resin.

Table I shows that under the test conditions sodium hydroxide, sodium carbonate, calcium carbonate and combinations of these additives at levels of 1 weight percent each were effective in preventing steel strips from being corroded. It is also to be noted that lower levels of the calcium carbonate showed some corrosion-inhibiting effect. At the 1 weight percent level sodium silicate, melamine, and sodium sulfite were not particularly effective corrosion inhibitors.

EXAMPLE II

This example demonstrates the effect of various additives on inhibiting the corrosion of molds during the injection molding of poly(phenylene sulfide) resins. A New Britain Model 75B injection molder and tensile bar mold were used in the mold corrosion evaluations. The bar mold employed a tensile bar insert made of Vega tool steel. The evaluation involved checking the Vega tool steel insert for corrosion after 100 shots of the various poly(phenylene sulfide) resin compositions. The test sequence was as follows: (a) the barrel was purged with the resin to be evaluated; (b) 100 shots were molded; (c) the mold was removed and the condition of the insert was observed for any sign of corrosion. The normal barrel temperature was 600° F (315° C). The mold temperature was 150° F (65° C) and the total cycle time was 48 seconds. The injection pressure was 15,000 psi (103 MPA). Clamp pressure was maximum.

The polymer composition was recycled during the evaluation to minimize the material required. A Formost chopper was employed for regrinding the molded polymer so that it could be recycled. To minimize the number of inserts that would be required as well as the time required to change the inserts, between tests the insert was cleansed with Ajax cleanser and water using a fiber brush. After this scrubbing the insert was washed with water and dried with a paper towel and blown dry with air. The compositions shown in Table II were prepared from cured pelletized Ryton R-4 resins containing about 40 weight percent glass fiber filler based on the weight of the resin and the glass fiber filler. The lots of glass-reinforced poly(phenylene sulfide) resins employed were known to cause the formation of corrosion on the Vega tool steel insert after only 100 shots in the injection molder. The various compositions reported in Table II were prepared by dry mixing the 40 weight percent glass-filled poly(phenylene sulfide) resin pellets with the additive prior to the injection molding to obtain an intimate mixture.

TABLE II

| Run No. | Additive, Weight Percent* | Appearance of Insert After 100 Shots |
|---|---|---|
| 17 | 1.67 $Na_2CO_3$ | No corrosion |
| 18 | 0.83 $Na_2CO_3$ | No corrosion |
| 19 | 0.42 $Na_2CO_3$ | No corrosion |
| 20 | 0.42 $Li_2CO_3$ | No corrosion |
| 21 | 1.67 $CaCO_3$ | Corrosion |
| 22 | 0.83 $CaCO_3$ | Corrosion |
| 23 | 8.3 $CaCO_3$ | Corrosion[c] |
| 24 | 16.7 $CaCO_3$ | No corrosion |
| 25 | 1.67 $Na_2CO_3$[a] | No corrosion |
| 26 | 1.67 $Na_2CO_3$[b] | No corrosion |

*Based on the weight of the poly(phenylene sulfide) resin.
[a]Barrel temperature 675° F (357° C).
[b]Barrel temperature 650° F (343° C).
[c]Corrosion was, however, less than that observed with 2.0 weight percent $CaCO_3$.

Table II demonstrates that sodium carbonate, at levels of 0.42, 0.83, and 1.67 weight percent based upon the weight of the resin was effective in substantially eliminating mold corrosion during the injection molding. The 1.67 weight percent level of sodium carbonate prevented the formation of mold corrosion after 100 shots even when the barrel temperature was allowed to reach temperatures of 650° F or 675° F. The 1.67 weight percent level of sodium carbonate did not adversely affect the tensile strength or flexural modulus of the glass-reinforced resin.

Even though calcium carbonate and sodium carbonate appeared to be equally effective corrosion inhibitors in the steel strip test reported in Example I, Table II shows that more than 8.3 weight percent of calcium carbonate was needed to insure that mold corrosion did not form after 100 shots in the injection mold. A level of 16.7 weight percent calcium carbonate was noted to adversely change the mechanical and flow properties of the poly(phenylene sulfide) resin composition so that under most circumstances it would not be practical to resort to the use of calcium carbonate in order to inhibit the corrosion of molds during injection molding.

Table II also shows that only a very small amount, viz. 0.42 weight percent, of lithium carbonate was necessary to prevent the formation of mold corrosion in 100 shots of the injection molder.

EXAMPLE III

A composition was prepared by dry blending some Ryton R-4 resins known to cause corrosion and 0.42 weight percent of lithium carbonate, based upon the weight of the poly(phenylene sulfide) resin. After 1,975 shots of this composition in the injection molder as described in the preceding example, no corrosion was seen on the Vega steel insert. Injection mold of the same glass-filled poly(phenylene sulfide) resin without the lithium carbonate present caused visible corrosion in only 25 to 50 shots in the injection molder.

EXAMPLE IV

For certain electrical applications it is desirable to have resin compositions having high insulation resistance. The insulation resistance between two electrodes that are in contact with, or imbedded in, a specimen is the ratio of the direct voltage applied to the electrodes to the current between them.

This example deals with the determination of the insulation resistance of various poly(phenylene sulfide) resin compositions to determine the effect of alkali metal carbonate corrosion inhibitors on the electrical insulation resistance. Compositions were prepared employing glass-filled poly(phenylene sulfide) resins of the same type as employed in the previous examples and about 0.42 or 0.5 weight percent, based on the weight of the resin of one of sodium carbonate, lithium carbonate, or potassium carbonate. Using a modified ASTM-D-257 test, the insulation resistance of these compositions were compared along with that of a composition composed of only the glass-filled resin.

To test the insulation resistance of the various compositions sheets 1/16 inches to ⅛ inches thick were molded and cut into 2-½ inches × 3-½ rectangular test specimens. In each of the specimens three 3/16 inch holes were drilled one ¼ inch apart, symetrically placed along the center line in the long dimension of these rectangles and Number 10–32 bolts were mounted in these holes with washers under the heads and nuts. A polyethylene cover was machined to fit the body of a dessicator and holes were drilled in the cover and fitted with bolts to serve as electrical feedthrough connections. A number of specimens were suspended below this cover by rigid copper wires connected between the bolts through the holes in the specimens and the bolts through the cover. Long insulated flexible wires were connected through the feed through bolts on the top of the polyethylene cover. Potassium sulfate crystals were placed in the bottom of the desiccator and covered with water, the polyethylene cover with suspended test specimens was then placed on the dessicator and the latter placed in a circulating air oven maintained at 60° C. Thermal shielding, consisting of an aluminum box and sheets of corrugated cardboard was used to surround the desiccator in the oven to prevent unevenness of temperature and condensation of the water. When the interior of the desiccator reached thermal and evaporative equilibrium, the temperature inside was 60° C and the relative humidity was 96.4 percent. The flexible wires connected to the top of the desiccator were led out of the oven through a hole in the top. Using a General Radio Megohmeter connected across pairs of the wires coming out of the oven, the resistance between each of the outer bolts through each sample and the center bolt, and also the resistance between the two outer bolts was determined. At least two wires were connected to bolts through the polyethylene cover which were not connected to anything below in order that conductance through a moisture film on the polyethylene cover could be detected if such conductance existed. The average of the resistances between the outer bolts and the center bolt, for each specimen, was reported as the insulation resistance of that specimen.

At the beginning of the testing all samples had an insulation resistance on the order of $10^{11}$ ohms. It should be noted that in comparing insulation resistance differences are not to be considered as significant unless they are greater than about $10^2$ ohms in magnitude. Table III below sets forth the results obtained with 0.5 weight percent based on the weight of the resin of alkali metal carbonates. Table IV below sets forth the results obtained with 0.42 weight percent alkali metal carbonates.

TABLE III

| Corrosion Inhibitor, Wt. % | Insulation Resistance 14 days at 60° C, 96.4% Relative Humidity Insulation Resistance (2 Minute Readings), ohms |
|---|---|
| None | $1.0 \times 10^{11}$ |
| 0.5 $Na_2CO_3$ | $1.3 \times 10^7$ |
| 0.5 $K_2CO_3$ | $6 \times 10^6$ |
| 0.5 $Li_2CO_3$ | $1.1 \times 10^{11}$ |

TABLE IV

| Corrosion Inhibitor, Wt. % | Insulation Resistance 5 days at 60° C, 96.4% Relative Humidity Insulation Resistance (1 Minute Readings), ohms |
|---|---|
| None | $1.5 \times 10^{11}$ |
| 0.42 $Na_2CO_3$ | $1.8 \times 10^7$ |
| 0.42 $Li_2CO_3$ | $2.4 \times 10^{11}$ |

Table III shows that after 14 days in the described environment, the insulation resistance of poly(phenylene sulfide) resin compositions containing no alkali carbonate and the poly(phenylene sulfide) resin compositions containing 0.5 weight percent lithium carbonate remained high while the insulation resistance of those compositions containing sodium or potassium carbonate had fallen several orders of magnitude.

Table IV shows that after 5 days the poly(phenylene sulfide) resin compositions containing 0.42 weight percent lithium carbonate have maintained high resistance, essentially equivalent to that of resin compositions containing no alkali metal carbonate, while the compositions containing 0.42 weight percent of sodium carbonate again had fallen several orders of magnitude in insulation resistance. In summary, the data reveals that lithium carbonate stabilized poly(phenylene sulfide) resin compositions have superior insulation resistance; therefore, lithium carbonate would be the preferred alkali metal corrosion inhibitor to employ in the injection molding of parts which are to serve as electrical insulators.

The foregoing description and examples have been provided to enable those skilled in the art to understand the present invention and its preferred embodiments. Obvious variations of the invention claimed below are considered to be within the scope of the claimed invention.

What is claimed is:

1. A method for improving a poly(arylene sulfide) resin composition so that it will be less likely to cause metal to corrode as a result of having been in contact with molten poly(arylene sulfide) resin in said composition, said method comprising forming an intimate mixture of said poly(arylene sulfide) resin and an amount of at least one hydroxide or carbonate of an alkali metal sufficient to reduce the corrosive nature of said poly(arylene sulfide) resin prior to placing said metal in contact with a molten state of said poly(arylene sulfide) resin.

2. A method according to claim 1 wherein the total amount of said hydroxide and said carbonate is in the range of about 0.1 to about 10 weight percent, based on the weight of the poly(arylene sulfide) resin in said intimate mixture.

3. A method according to claim 2 wherein said intimate mixture is formed employing at least one alkali metal carbonate.

4. A method according to claim 3 wherein said at least one alkali metal carbonate is selected from the group consisting of lithium carbonate, sodium carbonate, and potassium carbonate.

5. A method according to claim 1 wherein the total amount of said hydroxide and said carbonate is in the range of about 0.2 to about 5 weight percent, based on the weight of the poly(arylene sulfide) resin in said intimate mixture.

6. A method according to claim 1 wherein the total amount of said hydroxide and said carbonate is in the range of about 0.4 to about 2 weight percent, based on the weight of the poly(arylene sulfide) resin.

7. A method according to claim 6 wherein said intimate mixture is formed employing at least one alkali metal carbonate selected from the group consisting of lithium carbonate, sodium carbonate and potassium carbonate.

8. A method according to claim 7 where said poly(arylene sulfide) resin is poly(phenylene sulfide) resin and said poly(phenylene sulfide) resin contains glass fiber filler in such an amount that said glass fiber accounts for about 20 to about 60 weight percent of the combined weight of said glass fiber and said poly(phenylene sulfide) resin.

9. A method according to claim 8 wherein said alkali metal carbonate is at least one of lithium carbonate and sodium carbonate.

10. A method according to claim 9 wherein the alkali metal carbonate consists of lithium carbonate.

11. A composition of matter comprising an intimate mixture of poly(arylene sulfide) resin and at least one carbonate or hydroxide of an alkali metal, wherein the total amount of said alkali metal carbonate and hydroxide is present in an amount in the range of about 0.1 to about 10 weight percent based on the weight of said poly(arylene sulfide) resin.

12. A composition of matter according to claim 11 wherein said poly(arylene sulfide) resin is a molding grade poly(phenylene sulfide) resin.

13. A composition of matter according to claim 11 wherein alkali metal carbonate is present in an amount in the range of about 0.2 to about 5 weight percent based on the weight of said poly(arylene sulfide) resin.

14. A composition of matter according to claim 11 wherein alkali metal carbonate is present in an amount in the range of about 0.4 to about 2 weight percent based on the weight of said poly(arylene sulfide) resin.

15. A composition of matter according to claim 14 wherein said alkali metal carbonate is lithium carbonate and said poly(arylene sulfide) resin is a molding grade poly(phenylene sulfide) resin.

16. A composition of matter according to claim 15 wherein said poly(phenylene sulfide) resin contains glass fiber filler in such an amount that said glass fiber accounts for about 20 to about 60 weight percent of the combined weights of said glass fiber and said poly(phenylene sulfide) resin.

17. A composition of matter according to claim 14 wherein said alkali metal carbonate is selected from at least one of sodium carbonate, potassium carbonate, and lithium carbonate, and said poly(arylene sulfide) resin is a molding grade poly(phenylene sulfide) resin containing glass fiber filler in such an amount that said glass fiber accounts for about 20 to about 60 weight percent of the combined weights of said glass fiber and said poly(phenylene sulfide) resin.

* * * * *